(12) United States Patent
Thorsell

(10) Patent No.: US 10,844,883 B2
(45) Date of Patent: Nov. 24, 2020

(54) SPACER ASSEMBLY FOR A HYDRAULIC CYLINDER

(71) Applicant: Great Plains Manufacturing, Inc., Salina, KS (US)

(72) Inventor: Erik Thorsell, Salina, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 105 days.

(21) Appl. No.: 16/217,260

(22) Filed: Dec. 12, 2018

(65) Prior Publication Data

US 2020/0191175 A1 Jun. 18, 2020

(51) Int. Cl.
*F15B 15/24* (2006.01)
*A01B 63/22* (2006.01)
*A01D 34/66* (2006.01)

(52) U.S. Cl.
CPC .............. *F15B 15/24* (2013.01); *A01B 63/22* (2013.01); *A01D 34/66* (2013.01); *F15B 2215/30* (2013.01)

(58) Field of Classification Search
CPC ..... A01B 63/22; F15B 15/24; F15B 2015/267
See application file for complete search history.

(56) References Cited

U.S. PATENT DOCUMENTS

| | | | |
|---|---|---|---|
| 2,606,532 A * | 8/1952 | Ziskal | A01B 63/22 91/404 |
| 4,073,345 A * | 2/1978 | Miller | A01B 63/22 172/413 |
| 4,098,348 A * | 7/1978 | McChesney | A01B 63/22 172/400 |
| 5,988,293 A | 11/1999 | Brueggen et al. | |
| 7,044,047 B1 | 5/2006 | Bennett et al. | |
| 7,204,319 B2 * | 4/2007 | Hoehn | A01B 63/26 172/311 |
| 2017/0034989 A1 * | 2/2017 | Westlind | A01B 63/22 |
| 2018/0017089 A1 * | 1/2018 | Wintergerst | B62D 5/12 |

FOREIGN PATENT DOCUMENTS

| | | |
|---|---|---|
| EP | 1653088 B1 | 9/2010 |
| EP | 2854495 B1 | 4/2016 |

OTHER PUBLICATIONS

Kverneland Qualidisc Pro Disc Harrow, Qualidisc Pro: Compact disc harrow from 2.5 to 7 meter; Kverneland Group, Feb. 20, 2019; https://ien.kverneland.com/Soil-Equipment/Disc-Harrows/Kverneland-Qualidisc-Pro.

* cited by examiner

*Primary Examiner* — Michael Leslie
*Assistant Examiner* — Matthew Wiblin
(74) *Attorney, Agent, or Firm* — Hovey Williams LLP; Kameron D. Kelly

(57) ABSTRACT

A spacer assembly for restricting actuation of a hydraulic cylinder. The spacer assembly comprises a support bracket configured to be secured to the hydraulic cylinder. The spacer assembly additionally comprises a plurality of shims supported by the support bracket, whereby each of the shims is configured to be shifted between an unengaged position and an engaged position. When the shims are in the engaged position the shims are configured to restrict actuation of the hydraulic cylinder. The spacer assembly further comprises a shifting assembly configured to permit a group of at least two shims to be simultaneously shifted between the unengaged position and the engaged position.

16 Claims, 10 Drawing Sheets

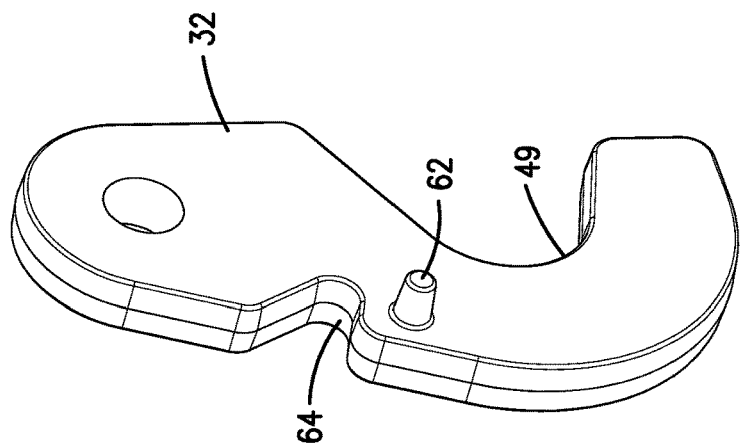
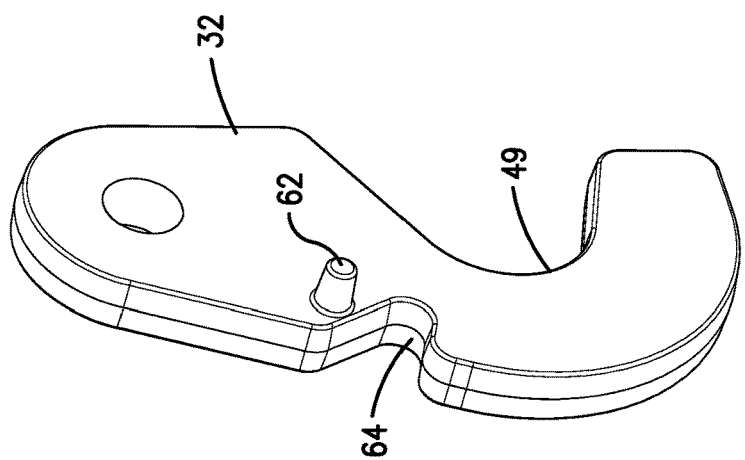
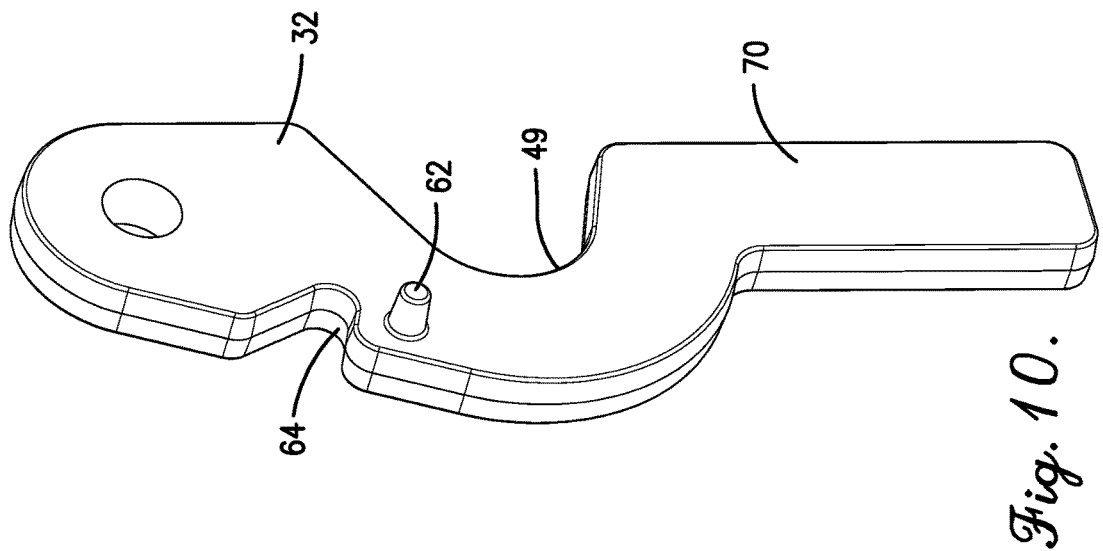

SPACER ASSEMBLY FOR A HYDRAULIC CYLINDER

FIELD OF THE INVENTION

Embodiments of the present invention are directed generally to a spacer assembly for a hydraulic cylinder. More particularly, embodiments of the present invention relate to a spacer assembly configurable to restrict movement of a hydraulic cylinder.

BACKGROUND OF THE INVENTION

Hydraulic cylinders are commonly used on many types of heavy-equipment machines and/or agricultural equipment. For example, one or more hydraulic cylinders may be used on a rotary cutter so as to raise and lower a frame of the rotary cutter (as well as cutter blades extending below the frame) with respect to wheels supporting the frame above the ground. In general, with the rotary cutter's hydraulic cylinder at full extension, the frame will be positioned at maximum height. In contrast, with the hydraulic cylinder at a full retraction, the frame will be positioned at a minimum height. As such, the hydraulic cylinder can control the height at which the frame of the rotary cutter is positioned above the ground, thereby controlling the height at which the vegetation will be cut by the cutter blades of the rotary cutter.

In many cases it is important for hydraulic cylinders to be precisely and repeatably actuated. For instance, for a rotary cutter, it may be necessary to consistently extend or retract the hydraulic actuators at a particular extension/retraction level during operation, such that the frame (or the cutting blades) of the rotary cutter can be consistently and repeatably positioned at a specified height during operation. Furthermore, it can be important to restrict movement of hydraulic actuators. For instance, for a rotary cutter, it may be necessary to restrict the hydraulic actuators from fully retracting (i.e., setting a retraction limit) because such a full retraction may cause the frame (or the cutting blades) of the rotary cutter to unwantedly make contact with the ground during operation.

SUMMARY OF THE INVENTION

In one embodiment of the present invention, there is provided a spacer assembly for restricting actuation of a hydraulic cylinder. The spacer assembly comprises a support bracket configured to be secured to the hydraulic cylinder. The spacer assembly additionally comprises a plurality of shims supported by the support bracket, whereby each of the shims is configured to be shifted between an unengaged position and an engaged position. When the shims are in the engaged position the shims are configured to restrict actuation of the hydraulic cylinder. The spacer assembly further comprises a shifting assembly configured to permit a group of at least two shims to be simultaneously shifted between the unengaged position and the engaged position.

In another embodiment of the present invention, there is provided an agricultural machine comprising a hydraulic cylinder including a barrel and a rod configured to extend from and retract within the barrel. The agricultural machine further comprises a spacer assembly for restricting actuation of the rod. The spacer assembly includes a support bracket configured to be secured to the hydraulic cylinder. The spacer assembly additionally includes a plurality of shims supported by the support bracket. Each of said shims is configured to be shifted between an unengaged position and an engaged position. When the shims are in the engaged position the shims are configured to restrict actuation of the hydraulic cylinder. The spacer assembly further comprises a shifting assembly configured to permit a group of at least two shims to be simultaneously shifted between the unengaged position and the engaged position.

In yet another embodiment of the present invention, there is provided a method of operating a hydraulic cylinder. The method comprises a step of extending a rod of the hydraulic cylinder from a barrel of the hydraulic cylinder. An additional step includes shifting a plurality of shims of a spacer assembly from an unengaged position to an engaged position. In the engaged position, the plurality of shims engages with the rod of the hydraulic cylinder. The shifting step includes simultaneously shifting two or more of the shims of the plurality of shims via a shifting assembly. A further step includes restricting, via the shims in the engaged position, the rod from retracting within the barrel.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 10 is a perspective view of a distal-most shim of the plurality of shims from the cylinder assembly shown in FIGS. 1, 3-5, 8, and 9;

FIG. 11 is a perspective view of a first shim of the plurality of shims from the cylinder assembly shown in FIGS. 1, 3-5, 8, and 9; and FIG. 12 is a perspective view a second shim of the plurality of shims from the cylinder assembly shown in FIGS. 1, 3-5, 8, and 9, with the second shim being an adjacent shim to the first shim.

Figure 1:
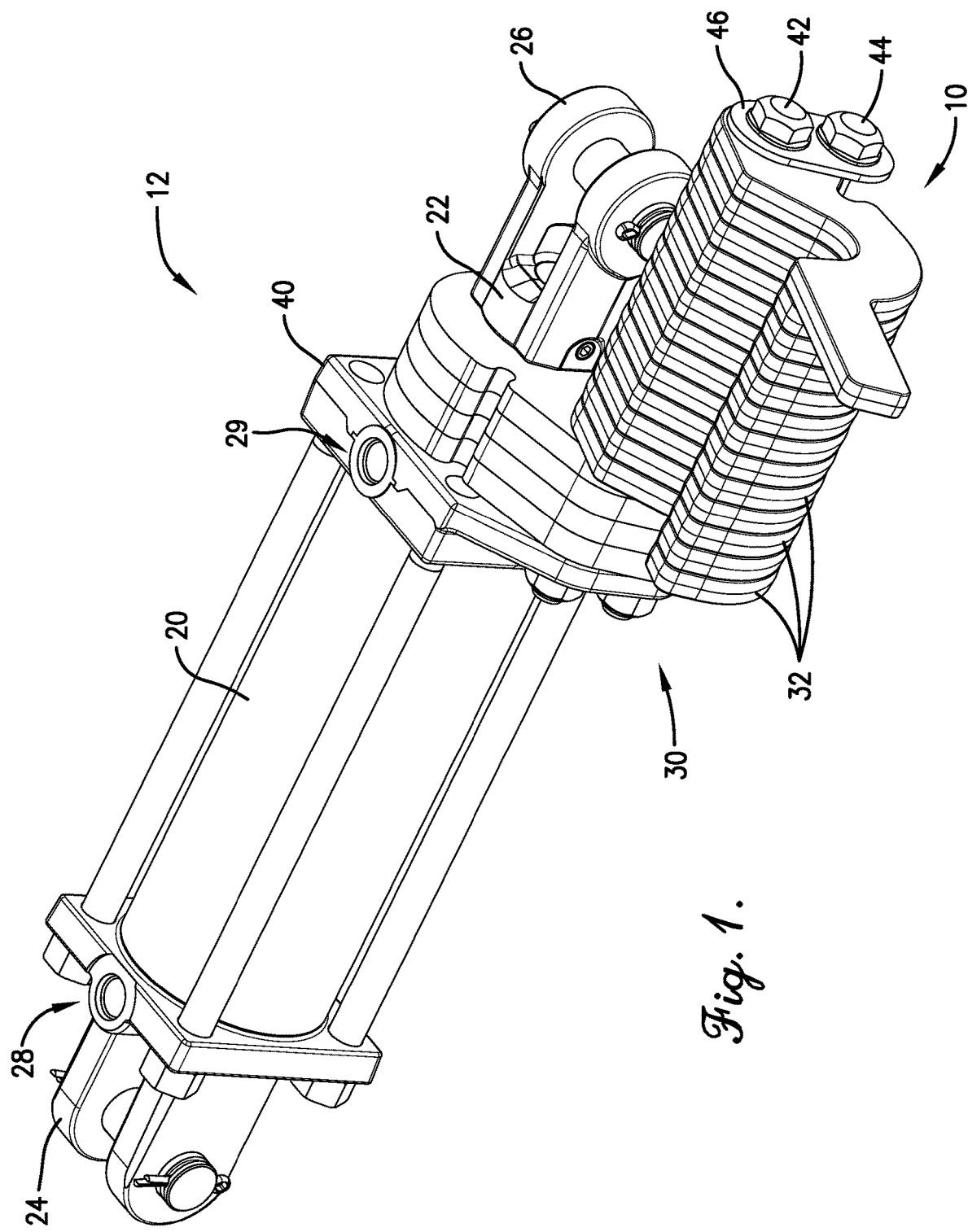
FIG. 1 is a top perspective view of a spacer assembly according to embodiments of the present invention connected to a hydraulic cylinder.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
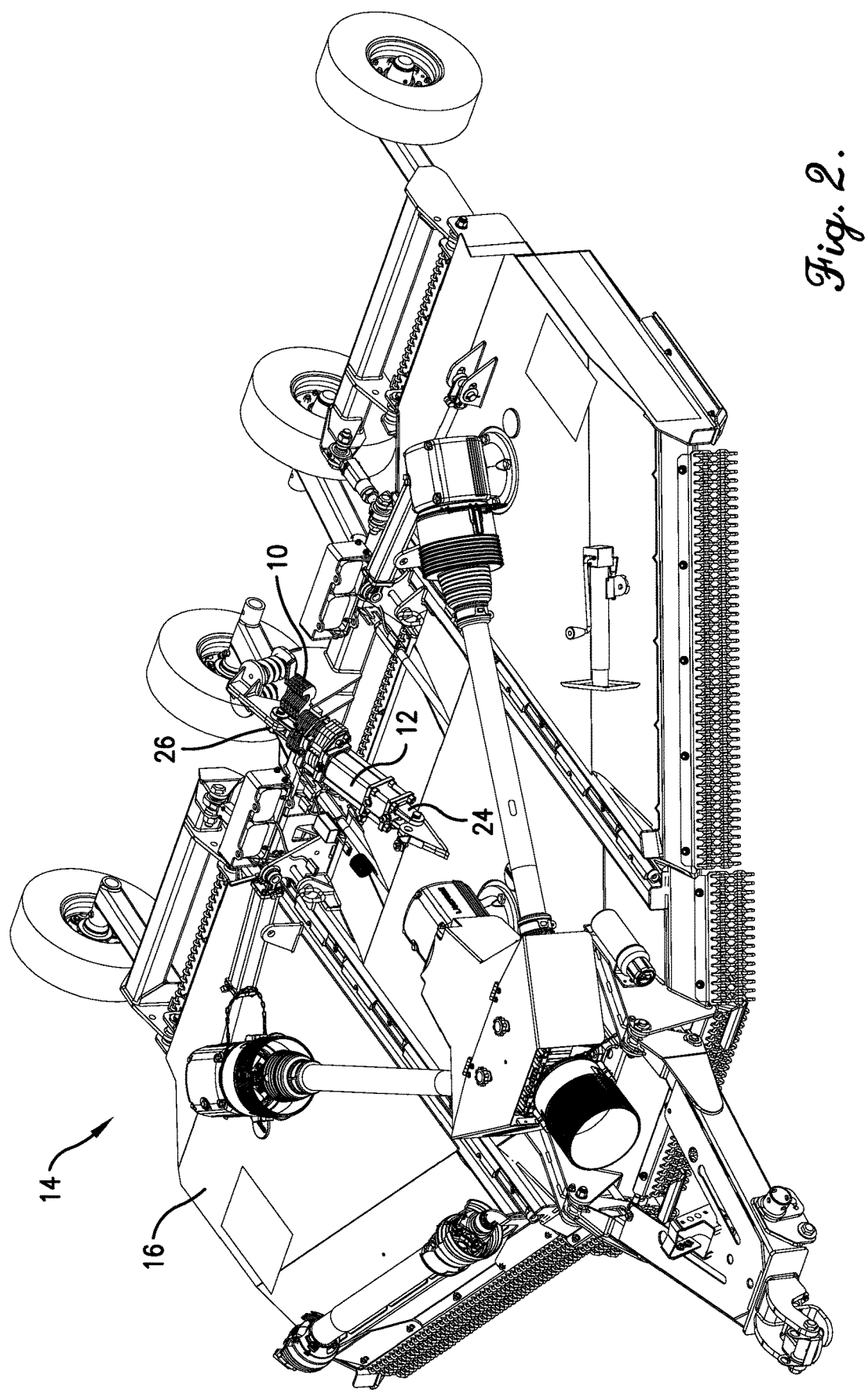
FIG. 2 is a front perspective view of a rotary cutter including the spacer assembly from FIG. 1.

Broadly, embodiments of the present invention are directed to a spacer assembly 10, as illustrated in FIG. 1, which can be used to limit or restrict actuation of a hydraulic cylinder 12, as will be discussed in more detail below. The spacer assembly 10 can be used in conjunction with hydraulic cylinders associated with various types of heavy-equipment machines or agricultural equipment. For instance, as illustrated in FIG. 2, the spacer assembly 10 is illustrated being used with a hydraulic cylinder 12 on a rotary cutter 14. The hydraulic cylinder 12 functions to raise and lower the frame 16 (or deck) of the rotary cutter 14 with respect to the wheels and/or the ground. Because the rotary cutter 14 includes a plurality of cutter blades (not shown) extending from below the frame 16, the raising and lowering of the frame 16 will cause a corresponding raising and lowering of the cutter blades so as to establish a cutting height for vegetation being cut by the rotary cutter 14.

Returning to FIG. 1, which shows the hydraulic cylinder 12 in more detail, the hydraulic cylinder 12 will generally comprise an outer barrel 20 and a rod 22 configured to extend from and retract within the barrel 20. The barrel 20 may include a barrel attachment bracket 24 positioned adjacent to a base of the barrel 20. The barrel attachment bracket 24 may be in the form of a bracket or other securement mechanism that is configured to facilitate securement of the hydraulic cylinder 12 to a heavy-equipment machine, agricultural equipment, or the like. In addition, the rod 22 may include a rod attachment bracket 26 secured to a distal end of the rod 22. The rod attachment bracket 26 may be in the form of a bracket or other securement mechanism that is configured to be secured to a component or mechanism that is to be actuated via the extension and/or retraction of the rod 22.

The barrel 20 includes a first port 28 on a proximal end of the barrel 20 and includes a second port 29 on a distal end of the barrel 20. In operation, pressurizing the hydraulic cylinder 12 by supplying hydraulic oil to the first port 28 will cause the rod 22 to extend distally (i.e., outward) from the distal end of the barrel 20. In contrast, pressurizing the hydraulic cylinder 12 by supplying hydraulic oil to the second port 29 will cause the rod 22 to retract within the barrel 20. As used herein, the term proximal is used to mean a position or direction towards a base of the hydraulic cylinder 12 (i.e., a leftward position or direction when observing FIG. 1). The term distal is used to mean a position or direction away from a base of the hydraulic cylinder 12 (i.e., a rightward position or direction when observing FIG. 1).

On the rotary cutter 14 of FIG. 2 for example, the attachment bracket 24 may be used to secure the hydraulic cylinder 12 to the frame 16 of the rotary cutter 14. The attachment bracket 24 can be secured to an actuation assembly that engages with the wheels of the rotary cutter 14, such that extending and retracting the rod 22 will cause a corresponding raising and lowering of the frame 16 of the rotary cutter 14. As will be discussed in more detail below, the spacer assembly 10 of embodiments of the present invention is configured to limit how far the rod 22 can be retracted within the barrel 20, so as to (at least with respect to the rotary cutter 14) (A) restrict how far the frame 16 of the rotary cutter 14 can be lowered, and/or (B) set an operational cutting height of the rotary cutter 14 that can be repeatably established. As such, the spacer assembly 10 is configured to set a retraction limit of a hydraulic cylinder 12 (i.e., a limit on how far the rod of the hydraulic cylinder can retract within the barrel). Such a retraction limit may also be defined as a minimum extension level for the rod 22 of the hydraulic cylinder 12.

In more detail, and with reference to FIGS. 3-6, the spacer assembly 10 may broadly comprise a support bracket 30 that rotatably supports a plurality of rotatable shims 32 adjacent to the distal end of the barrel 20 and/or adjacent to the rod 22. In some embodiments, the support bracket 30 may comprise a base element 40, such as a plate, which is configured to be secured to the distal end of the barrel 20. The base element 40 may be secured to the barrel 20 via fasteners, welding, or the like. In some embodiments, the base element 40 may be integrated with the barrel 20 so as to form part of the hydraulic cylinder 12. The support bracket 30 may further comprise a pair of support elements, such as shafts, which extend distally from the base element 40. The support elements may comprise a first support shaft 42 on which the plurality of shims 32 are rotatably secured. Specifically, the first support shaft 42 may extend through openings formed in the shims 32. As such, the first support shaft 42 presents a rotational axis about which the shims 32 are configured to rotate. The support elements may further comprise a second support shaft 44 positioned below the first support shaft 42 on which the plurality of shims 32 are rotatably secured. As perhaps best shown in FIG. 1, the support bracket 30 may further comprise an end element 46, such as a plate, to which distal ends of the first and second support shafts 42, 44 are secured. As such, the first and second support shafts 42, 44 may extend generally between the base element 40 and the end element 46. The first and second support shafts 42, 44 may be secured in place on the base element 40 and the end element 46 via threaded nuts, which are configured to be secured on threaded ends of the first and second support shafts 42, 44 that extend through openings in the base element 40 and the end element 46.

Figure 6:
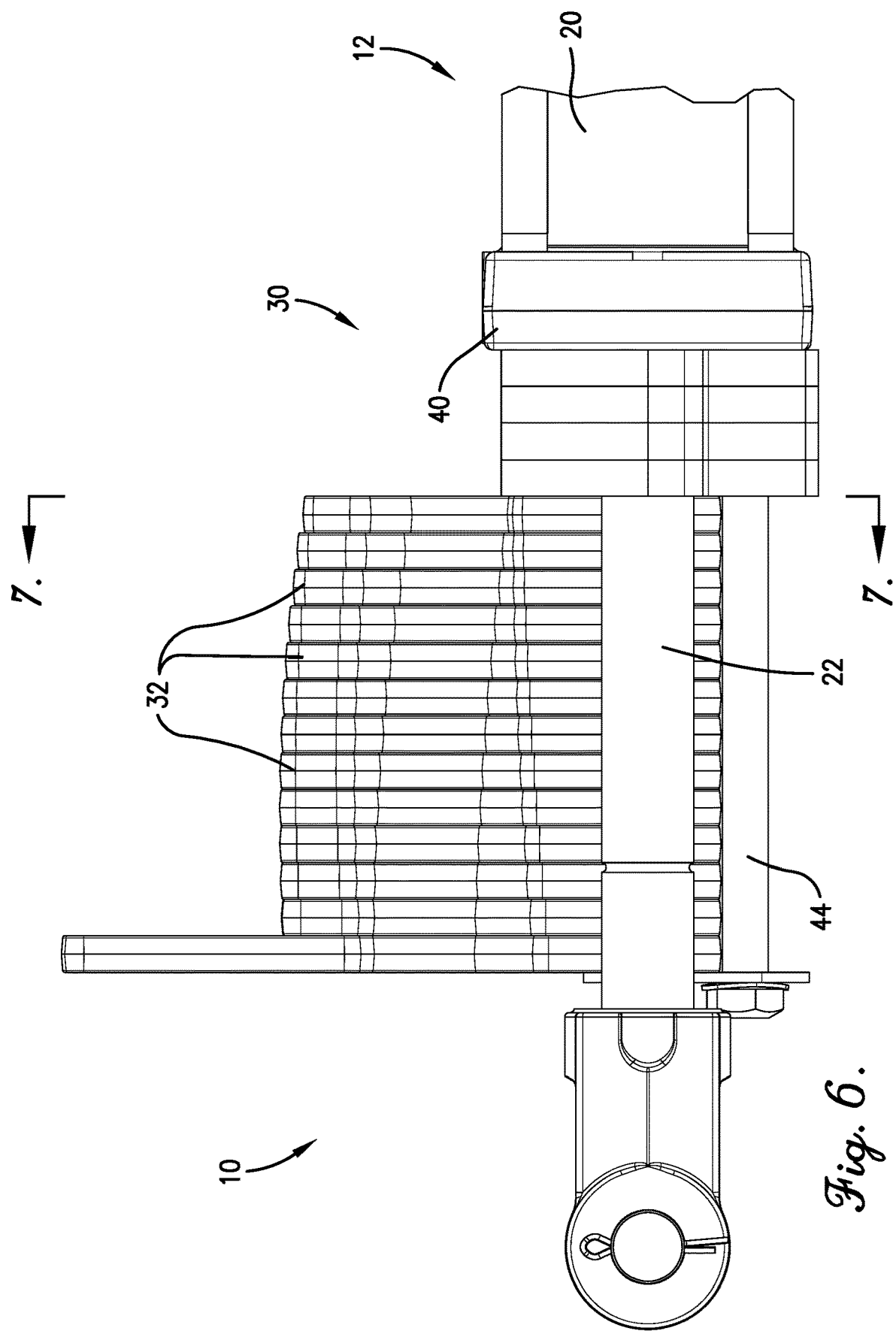
FIG. 6 is a side elevation view of the spacer assembly and the hydraulic cylinder from FIGS. 1 and 3-5, with a portion of the hydraulic cylinder cut away, and particularly illustrating the plurality of shims in the position between the unengaged position and the engaged position.
Figure 7:
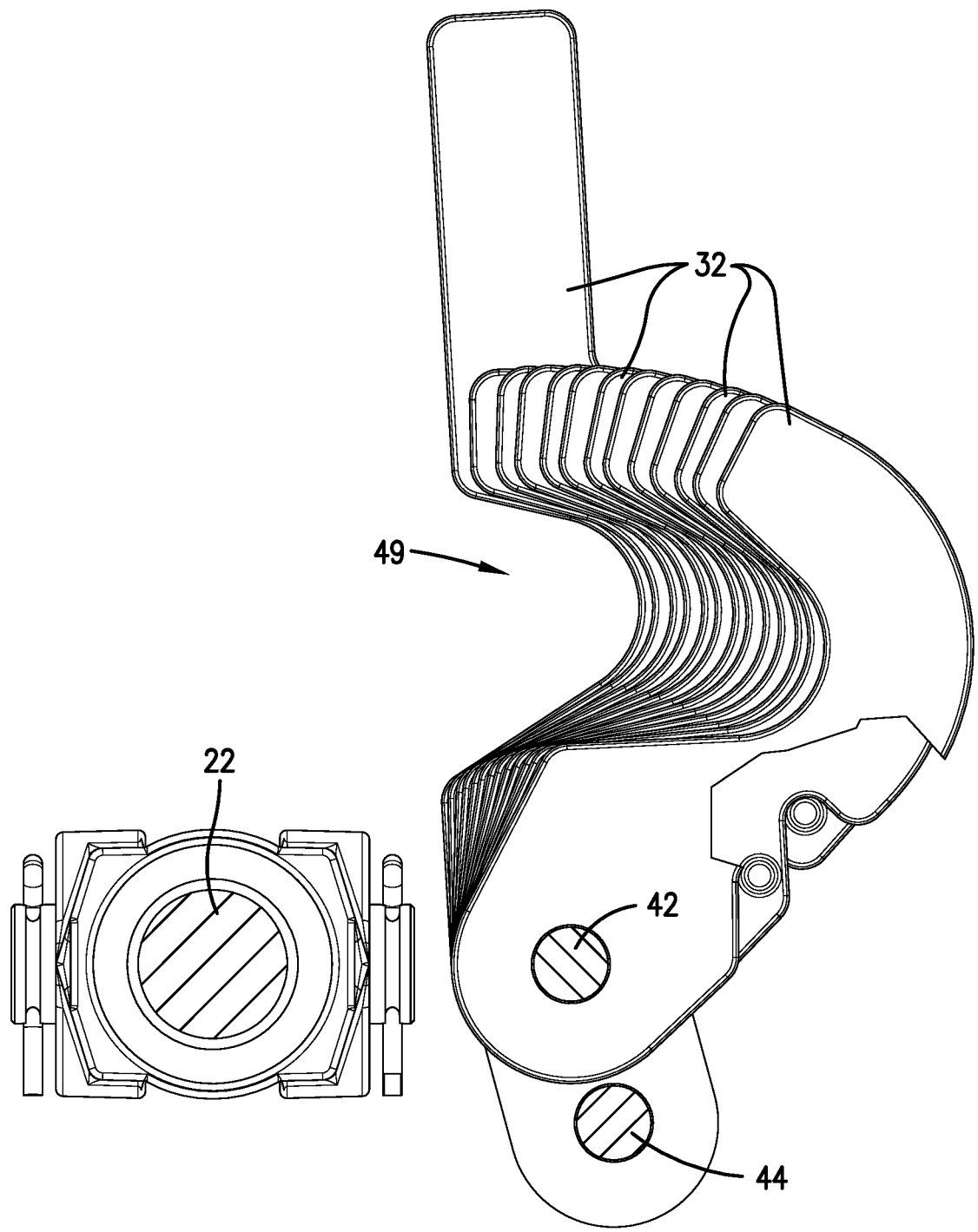
FIG. 7 is a cross section of the spacer assembly and the hydraulic cylinder from FIGS. 1 and 3-6 taken along the line 7-7 from FIG. 6.

Turning now to the rotatable shims 32 in more detail, and as perhaps best illustrated in FIGS. 6 and 7, each of the shims 32 may comprise a thin, elongated section of material that extends from the first support shaft 42. Embodiments may provide for a thickness of the shims 32 to vary depending on operational requirements. However, in some embodiments, each of the shims 32 will have generally the same thickness. The number of shims 32 used in the spacer assembly 10 may vary depending on various conditions/requirements, such as size of the hydraulic cylinder 12 and/or the rod 22, retraction limit requirements for the rod 22, etc. On a first side of each of the shims 32, the shim 32 may include a concave-shaped surface presenting a grooved or cupped engagement section (referred to herein as the "rod-engagement section 49"). As perhaps best illustrated in FIG. 7, the rod-engagement sections 49 will have a shape that generally corresponds with the shape of the rod 22, such that the rod-engagement sections 49 of the shims 32 are capable of engaging with or embracing the rod 22.

Figure 3:
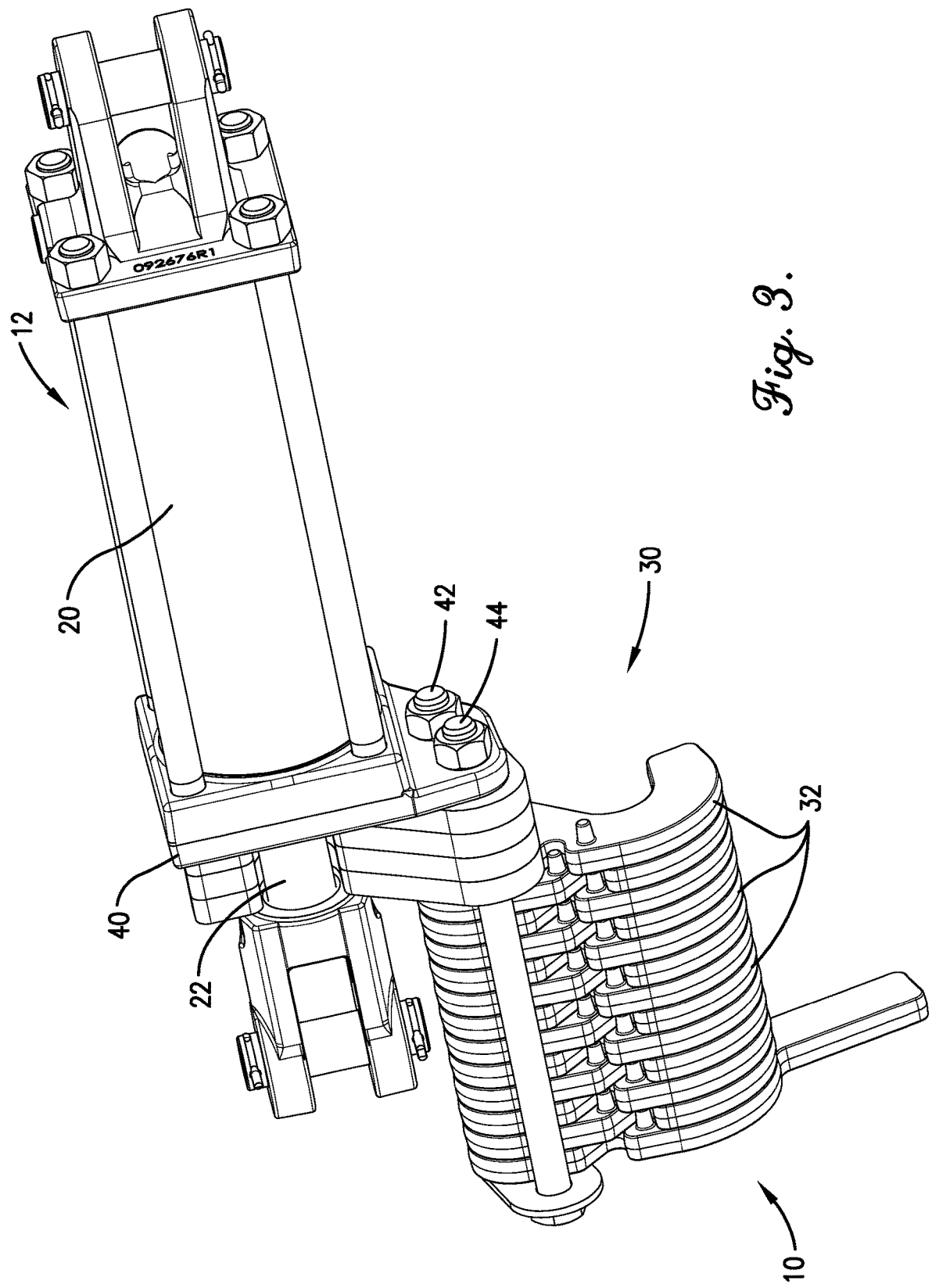
FIG. 3 is a bottom perspective view of the spacer assembly and the hydraulic cylinder from FIG. 1, particularly illustrating a plurality of shims of the spacer assembly being in an unengaged position.
Figure 8:
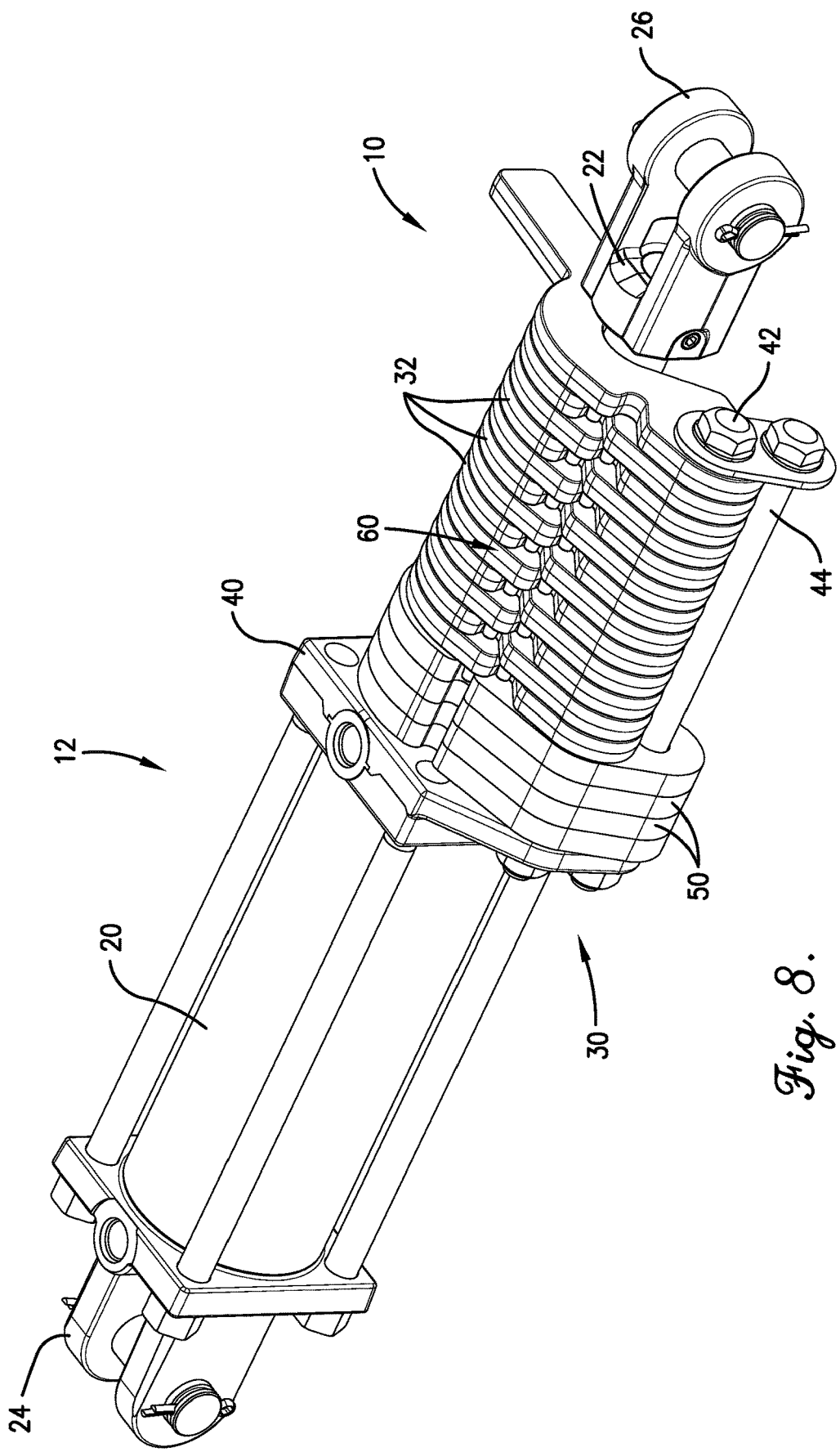
FIG. 8 is another top perspective view of the spacer assembly and the hydraulic cylinder from FIGS. 1 and 3-5, particularly illustrating the plurality of shims being in the engaged position.

In more detail, the rotatable shims 32 are each generally configured to be rotated between an unengaged position and an engaged position. In the unengaged position, as illustrated in FIGS. 1 and 3, the shims 32 are rotated away from the rod 22 so as to not be engaged with the rod 22. When in the unengaged position, a second side of each of the shims 32 (i.e., a side opposite the first side of the shims 32 that presents the rod-engagement section 49) may contact and be supported in the unengaged position by the second support shaft 44. From the unengaged position, the shims 32 may be rotated about the first support shaft 42 towards the rod 22 approximately 180° to the engaged position, such that the rod-engagement sections 49 of the shims engage with the rod 22, as illustrated in FIG. 8. Specifically, in the engaged position, the rod-engagement sections 49 (not shown in FIG. 8) will be engaged with or embrace the rod 22, such that the shims 32 can act as mechanical stops to restrict the rod 22 from retracting within the barrel. Specifically, because the shims 32 (when in the engaged position) are positioned between the distal end of the barrel 20 and the attachment bracket 26 on the distal end of the rod 22, the shims 32 can act as mechanical stops by interfering with the attachment bracket 26 as the rod 22 is being retracted within the barrel 20.

Figure 9:
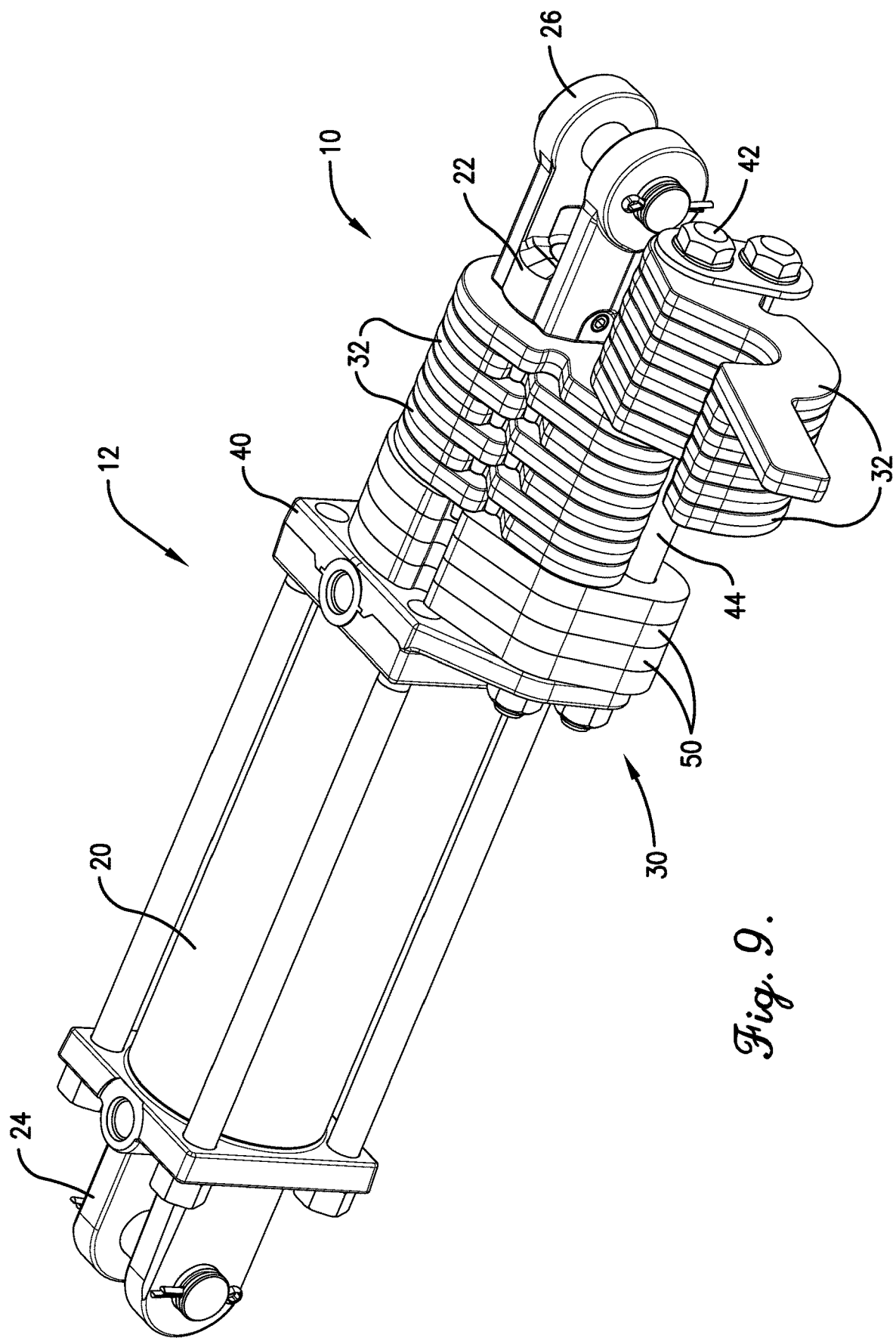
FIG. 9 is another top perspective view of the spacer assembly and the hydraulic cylinder from FIGS. 1, 3-5, and 8, particularly illustrating a set of the plurality of shims being in the engaged position and another set of the shims being in the unengaged position.

Beneficially, because each of the shims 32 can be individually rotated between the unengaged position and the engaged position, a specified retraction limit can be established by the spacer assembly 10. For example, as shown in FIG. 8, if all of the shims 32 are positioned in the engaged position, the rod 22 will be maximally restricted from retracting into the barrel 20. As such, the rod 22 is prevented from retracting very much at all into the barrel 20, such that the position of the rod 22 is maintained at near a maximum extension level. Alternatively, if only about half of the shims 32 are positioned in the engaged position, the rod 22 will be permitted to retract further into the barrel 20, as is illustrated in FIG. 9. As such, the rod 22 is prevented from retracting fully into the barrel 20, such that the position of the rod 22 is maintained at about an intermediate extension level. It should be understood that any number of the shims 32 may be positioned in the engaged position so as to establish a specific retraction limit (i.e., the amount by which the rod 22 can retract within the barrel 20) or extension level of the rod 22 with respect to the hydraulic cylinder 12.

If all of the shims 32 are positioned in the unengaged position (not shown in the drawings), the rod 22 will be permitted to fully retract into the barrel 20. However, as illustrated in the drawings (e.g., FIGS. 8 and 9), in some embodiments the spacer assembly 10 may be configured to include one or more fixed shims 50. In some embodiments, such fixed shims 50 will be secured in a position adjacent to the distal end of the barrel 20. The fixed shims 50 may be shaped similar to the rotatable shims 32 so as to include a rod-engagement section (not shown in the drawings) configured to engage with and/or embrace the rod 22. However, each of the first and second support shafts 42, 44 may extend through the fixed shims 50 (via spaced apart openings formed through the fixed shims 50), such that the fixed shims 50 are fixed in place and prevented from rotating. Specifically, the fixed shims 50 are fixed in the engaged position such that the rod-engagement sections of the fixed shims 50 are constantly engaged with and/or embracing the rod 22. Thus, the fixed shims 50 function to provide a maximum retraction limit for the rod 22 (i.e., the maximum amount by which the rod 22 can retract within the barrel 20). Such a maximum retraction limit may correspond to a minimum extension level for the rod 22. The maximum retraction limit can be set by the number of fixed shims 50 used in the spacer assembly 10. The use of fewer (e.g., 0-2) fixed shims 50 means that the rod 22 can retract further into the barrel 50 than when more (e.g., 3-6) fixed shims 50 are used.

Embodiments of the present invention further provide for the spacer assembly 10 to include a shifting assembly that aids in rotating the rotatable shims 32. For example, as illustrated in FIG. 8 the shifting assembly may comprise a plurality of inter-engaging elements 60 positioned on each of the shims 32. Turning to FIGS. 10-12 for more detail, the inter-engaging elements 60 may comprise a plurality of protrusions 62 and notches 64. Each of the shims 32 may include a protrusion 62 (or boss) and a notch 64 (or indentation) formed on the second side of the shim 32 (i.e., the side of the shim 32 opposite the rod-engagement section 49). As perhaps best illustrated in FIGS. 11 and 12, a protrusion 62 of a given shim 32 is generally positioned above or below a notch 64 of that given shim 32. As such, certain embodiments provide for the protrusion 62 of a given shim 32 will be in general alignment with a notch 64 of an adjacent shim 32 (such alignment is illustrated in FIGS. 11 and 12). Given such a configuration, the rotatable shims 32 are configured to inter-engage with each other, as shown in FIG. 8 (i.e., the protrusion 62 of a given shim 32 is configured to engage with the notch 64 of an adjacent shim 32). Such inter-engagement may exist between each adjacent shim 32 in the spacer assembly 10.

Figure 4:
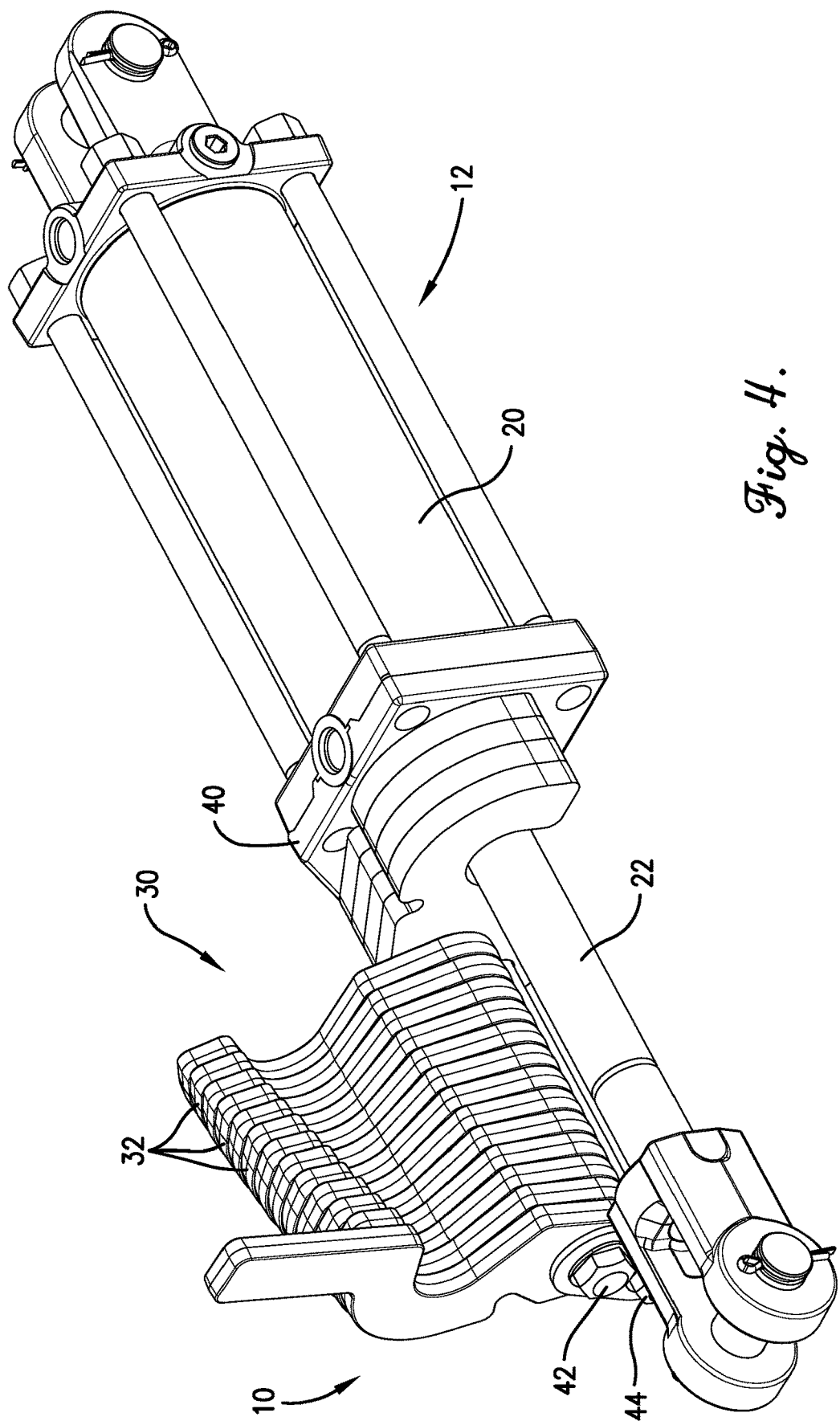
FIG. 4 is another top perspective view of the spacer assembly and the hydraulic cylinder from FIGS. 1 and 3, particularly illustrating the plurality of shims in a position between the unengaged position and an engaged position.
Figure 5:
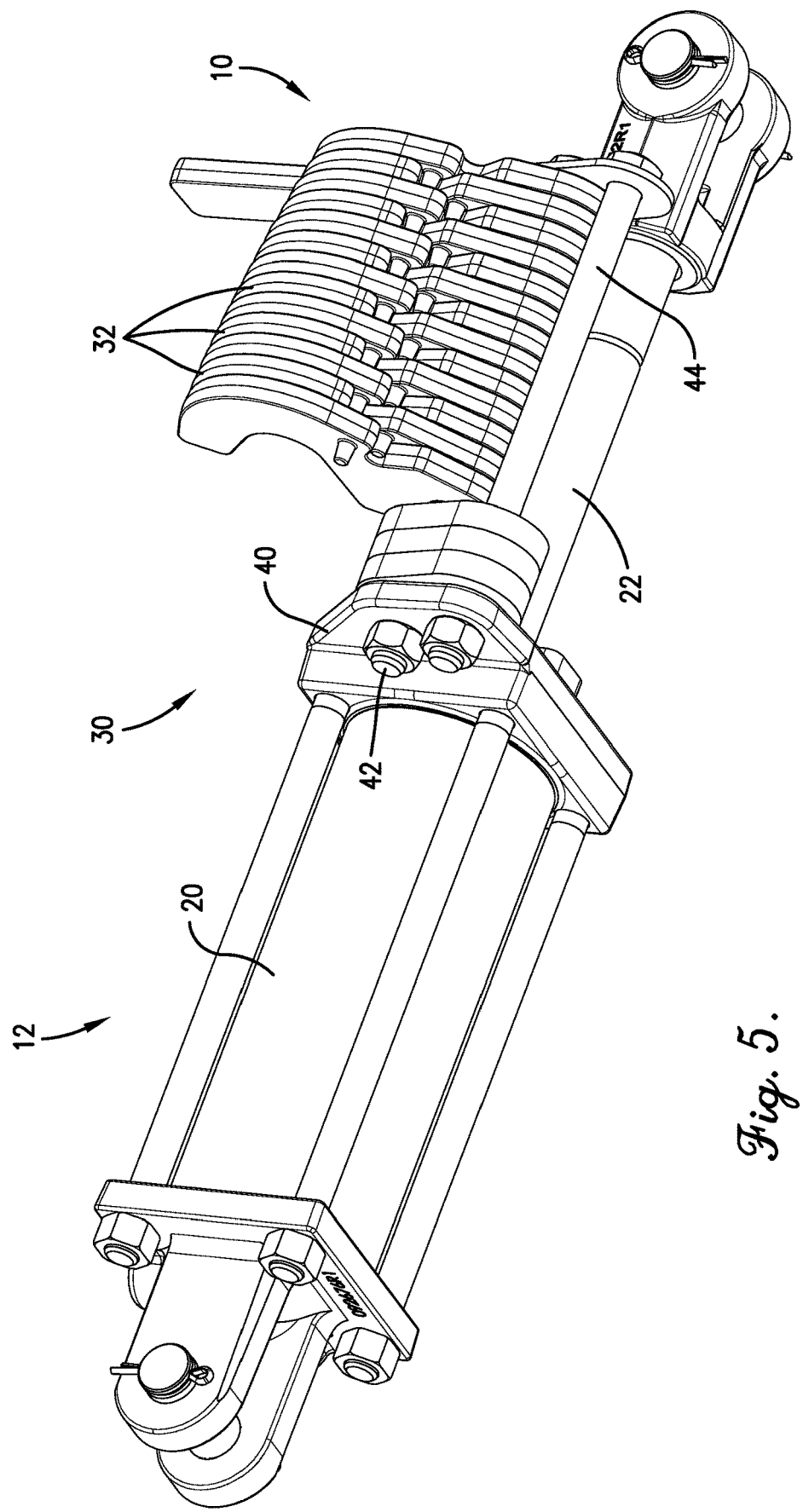
FIG. 5 is another bottom perspective view of the spacer assembly and the hydraulic cylinder from FIGS. 1, 3, and 4, particularly illustrating the plurality of shims in the position between the unengaged position and the engaged position.

As such, the shifting assembly (comprised of the inter-engaging elements 60) is configured to permit a user to efficiently shift a group of two or more (or all) of the shims 32 simultaneously from the unengaged position to the engaged position (or, alternatively, from the engaged position to the unengaged position). For example, as illustrated in FIGS. 1 and 3, each of the shims 32 is in the unengaged position. However, each of the shims 32 has its protrusion 62 engaged with the notch 64 of its adjacent shim 32 (with the exception of the proximal-most shim 32 which has no adjacent shim 32 with which to engage its protrusion 62). In such a configuration, all of the shims 32 can be simultaneously shifted from their unengaged positions to engaged positions by rotating only a single shim 32, and particularly, by rotating the distal-most shim 32. FIGS. 4 and 5 illustrates each of the shims 32 being shifted simultaneously from the unengaged position to the engaged position. FIG. 8 illustrates all of the shims 32 having been positioned in the engaged position. To aid in such simultaneous shifting, some embodiments of the shifting assembly may provide for the distal-most shim 32 to include a handle 70 (See FIG. 10) extending outward from a body of the distal-most shim 32, which a user can grab to actuate all of the shims 32 at once.

Depending on how many shims 32 are configured to be associated with the shifting assembly (i.e., the protrusions 62 and the notches 64), the shifting assembly can be used to simultaneously shift any group of two or more shims 32 from the unengaged position to the engaged position (or vice versa).

Although the above description illustrates how all (or a group of two or more) of the shims 32 can be simultaneously shifted from the unengaged position to the engaged position, the spacer assembly 10 still provides for individual shims 32 to be shifted between unengaged and engaged positions (and vice versa). For example, with each of the shims 32 positioned in the unengaged position (e.g., FIGS. 1 and 3), shims 32 can be individually shifted to the engaged position. To accomplish such, the proximal-most shim 32 may need to shift first. Then, adjacent shims 32 can be sequentially shifted in an individual manner.

Beneficially, the configuration of the spacer assembly 10 according to embodiments of the present invention prevents shims 32 from being inadvertently damaged (e.g., bent or sheared off) via actuation of the rod 22. In more detail, if a distally-positioned shim 32 is shifted to the engaged position, while one or more shims 32 between the distally-positioned shim 32 and the barrel 20 remain in the unengaged position (so as to form a gap between the distally-positioned shim 32 and the barrel 20), the distally-positioned shim 32 can be damaged during retraction of the rod 22. To prevent such an occurrence, the spacer assembly 10 is configured to restrict the formation of gaps between shims 32 in the engaged position and the barrel 20. For example, when simultaneously shifting all (or a group) of the shims 32 from the unengaged position to the engaged position, such shifting is performed via the distal-most shim 32. Advantageously, the inter-engaging elements 60 (i.e., the protrusions 62 and notches 64) provide that each of the shims 32 between the distal-most shim 32 and the barrel 20 are also shifted to the engaged position. As such, there is no gap left between the distal-most shim 32 and the barrel 20, which could result in the distal-most shim 32 being damaged during retraction of the rod 22. Similarly, if the shims 32 are shifted individually from the unengaged position to the engaged position, embodiments of the spacer assembly 10 require that the shims 32 be shifted sequentially starting with the proximal-most shim 32. Such a shifting procedure inhibits the creation of gaps between shims 32, which could result in one or more shim 32 being damaged during retraction of the rod 22.

In addition to simultaneously shifting all (or a group of two or more) of the shims 32 from an unengaged position to an engaged position, embodiments may provide for the simultaneously shifting all (or a group of two or more) of the shims 32 from an engaged position to an unengaged position. For instance, with each of the shims 32 being positioned in an engaged position (e.g., FIG. 8), each of the shims 32 has their protrusion 62 engaged with the notch 64 of its adjacent shim 32 (it is noted that the proximal-most shim 32 has its protrusion 62 engaged with a notch 64 formed in an adjacent fixed shim 50). In such a configuration, all of the shims 32 can be simultaneously shifted from their engaged positions to unengaged positions by rotating only a single shim 32, and particularly, by rotating the proximal-most shim 32 from its engaged position to its unengaged position. FIGS. 1 and 3 illustrate all of the shims 32 having been shifted to the unengaged position.

A method of operating a hydraulic cylinder 12 that includes the above-described spacer assembly 10 will now be described in more detail. First, the rod 22 of the hydraulic cylinder 12 may be extended from the barrel 20 of the hydraulic cylinder 12. In some embodiments, the rod 22 may be fully extended from the barrel 20. An additional step then includes shifting a plurality of the rotatable shims 32 of the spacer assembly 10 from an unengaged position to an engaged position. In some embodiments, a group of two or more of the rotatable shims 32 may be simultaneously shifted from the unengaged position to the engaged position via the shifting assembly (e.g., the inter-engaging elements 60). In the engaged position, the plurality of shims 32 engages with the rod 22 of the hydraulic cylinder 12 so as to restrict the rod 22 from retracting within the barrel 20. In some embodiments, the shifting step may include simultaneously shifting all of the shims 32 from the unengaged position to the engaged position. In some additional embodiments, one or more shims 32 may be individually shifted from the engaged position to the unengaged position so as to accurately set a retraction limit (and/or extension level) for the rod 22 of the hydraulic cylinder 12. Specifically, in the unengaged position the shims 32 do not engage with the rod 22 of the hydraulic cylinder 12 so as to not restrict the rod 22 from retracting within the barrel 20. As such, the rod 22 can retract further within the barrel 20 in a manner that permits a user to set a retraction limit for the hydraulic cylinder 12.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

What is claimed is:

1. A spacer assembly for restricting actuation of a hydraulic cylinder, said spacer assembly comprising:
   a support bracket configured to be secured to the hydraulic cylinder;
   a plurality of shims supported by the support bracket, wherein each of said shims is configured to be shifted between an unengaged position and an engaged position, and wherein when said shims are in the engaged position said shims are configured to restrict actuation of the hydraulic cylinder; and
   a shifting assembly configured to permit a group of at least two shims to be simultaneously shifted between the unengaged position and the engaged position,
   wherein said shifting assembly comprises a plurality of inter-engaging elements associated with said shims, wherein said plurality of inter-engaging elements includes a protrusion and a notch on each of said shims, wherein the protrusions of said shims are configured to engage with notches of adjacent shims,
   wherein the protrusion on each shim is set apart from the notch on the respective shim.

2. The spacer assembly of claim 1, wherein said shims are rotatably connected to said support bracket.

3. The spacer assembly of claim 2, wherein each of said shims includes a rod-engagement section having a shape conforming to a shape of a rod of the hydraulic cylinder, wherein in the unengaged position the rod-engagement sections of said shims do not engage with the rod, and wherein in the engaged position the rod-engagement sections of said shims engage with the rod.

4. The spacer assembly of claim 1, wherein the protrusion of a first shim from the plurality of shims is configured to engage with a notch of a second shim from the plurality of shims, wherein the first shim is adjacently positioned to the second shim.

5. The spacer assembly of claim 4, wherein a first side of each of said shims includes a rod-engagement section having a shape conforming to a shape of a rod of the hydraulic cylinder, wherein the protrusion and the notch of each shim are formed on a second side of said shim opposite the rod-engagement section.

6. The spacer assembly of claim 1, wherein said shifting assembly is configured to simultaneously shift all of said shims in the plurality of shims.

7. The spacer assembly of claim 1, wherein at least one of said shims includes a handle for aiding in shifting said shims.

8. The spacer assembly of claim 1, wherein said support bracket includes a base element secured to a barrel of the hydraulic cylinder, wherein said support bracket includes a support shaft extending from said base element, and wherein said shims are configured to rotate about said support shaft.

9. The spacer assembly of claim 1, wherein said plurality of shims comprises rotatable shims, and wherein said spacer assembly further comprises one or more fixed shims.

10. An agricultural machine comprising:
a hydraulic cylinder including a barrel and a rod configured to extend from and retract within said barrel;
a spacer assembly for restricting actuation of said rod, wherein said spacer assembly includes—
a support bracket configured to be secured to said hydraulic cylinder;
a plurality of shims supported by said support bracket, wherein each of said shims is configured to be shifted between an unengaged position and an engaged position, and wherein when said shims are in the engaged position said shims are configured to restrict actuation of said hydraulic cylinder; and
a shifting assembly configured to permit a group of at least two shims to be simultaneously shifted between the unengaged position and the engaged position,
wherein said shifting assembly comprises a plurality of inter-engaging elements associated with said shims, wherein said plurality of inter-engaging elements includes a protrusion and a notch on each of said shims, wherein the protrusions of said shims are configured to engage with notches of adjacent shims,
wherein the protrusion on each shim is set apart from the notch on the respective shim.

11. The agricultural machine of claim 10, wherein the protrusion of a first shim from the plurality of shims is configured to engage with a notch of a second shim of the plurality of shims, wherein said first shim is adjacently positioned to said second shim.

12. The agricultural machine of claim 11, wherein a first side of each of said shims includes a rod-engagement section having a shape conforming to a shape of said rod of said hydraulic cylinder, wherein the protrusion and the notch of each shim are formed on a second side of said shim opposite said rod-engagement section.

13. The agricultural machine of claim 10, wherein said shifting assembly is configured to simultaneously shift all of said shims in the plurality of shims.

14. The agricultural machine of claim 10, wherein at least one of said shims includes a handle for aiding in shifting said shims.

15. A method of operating a hydraulic cylinder, said method comprising the steps of:
(a) extending a rod of the hydraulic cylinder from a barrel of the hydraulic cylinder;
(b) shifting a plurality of shims of a spacer assembly from an unengaged position to an engaged position, wherein in the engaged position the plurality of shims engages with the rod of the hydraulic cylinder,
wherein said shifting of step (b) includes simultaneously shifting two or more of the shims of the plurality of shims via a shifting assembly,
wherein the shifting assembly comprises a plurality of inter-engaging elements associated with the shims, wherein the plurality of inter-engaging elements includes a protrusion and a notch on each of the shims, wherein the protrusions of the shims are configured to engage with notches of adjacent shims, wherein the protrusion on each shim is set apart from the notch on the respective shim; and
(c) restricting, via the shims in the engaged position, the rod from retracting within the barrel.

16. The method of claim 15, further including the step of shifting one or more of the shims from the plurality of shims from the engaged position to the unengaged position, wherein in the unengaged position the one or more shims do not engage with the rod of the hydraulic cylinder and do not restrict the rod from retracting within the barrel.

* * * * *